United States Patent [19]

Baxter et al.

[11] 4,371,902
[45] Feb. 1, 1983

[54] DISK INITIALIZATION METHOD

[75] Inventors: Duane W. Baxter; Joseph L. Evjen, Jr.; William C. Hoveland, all of Rochester; Roy A. Roble, Byron; Donald R. Smith, Rochester; John H. Wirz, Pine Island, all of Minn.

[73] Assignee: International Business Machines Corporation, Armonk, N.Y.

[21] Appl. No.: 164,727

[22] Filed: Jun. 30, 1980

[51] Int. Cl.³ .................. G11B 21/02; G11B 21/10
[52] U.S. Cl. .................................. 360/75; 360/77
[58] Field of Search .............. 360/75, 77, 78, 98, 360/95, 105, 106, 107, 30

[56] References Cited

U.S. PATENT DOCUMENTS

| | | | |
|---|---|---|---|
| 4,068,268 | 1/1978 | Idemoto | 360/75 |
| 4,149,201 | 4/1979 | Card | 360/75 |
| 4,188,646 | 2/1980 | Sordello | 360/77 |
| 4,259,698 | 3/1981 | Takada | 360/75 |
| 4,286,296 | 8/1981 | Cunningham | 360/77 |

*Primary Examiner*—Robert M. Kilgore
*Attorney, Agent, or Firm*—Robert W. Lahtinen

[57] ABSTRACT

A rotating magnetic memory, such as a disk drive using sector servo information, is initialized with servo information by first using the dedicated product head assembly, including transducers and the mounting and accessing mechanisms associated therewith, to write on the innermost and outermost data tracks, following which the tracks written by each transducer are read using a precision servowriter mechanism which is then positioned to duplicate the access path of the product head assembly and determine the position of such innermost and outermost tracks. By then offsetting the precision servowriter by a half track pitch and writing the servo information to form equally spaced tracks, the disk is initialized with full track pitch servo information which is positioned and aligned with the position and alignment of the dedicated product head assembly.

8 Claims, 3 Drawing Figures

DISK INITIALIZATION METHOD

BACKGROUND

Magnetic disk drive sector servo systems are set up with the servo sector tracks offset from the data sector tracks by a half track spacing such that the device read/write head is centered on a data track when so aligned as to receive signals of equal strength from interfacing sector servo track portions. Since the sector servo information is used at the margins of the written tracks it is imperative that the servo data be written to the full track width whereas data tracks use only about 80 percent of the intertrack spacing and are accordingly narrower than the track pitch.

There are two common methods for initializing the disk or disks with sector servo information. The product head or a head narrower than the intertrack pitch may be used by making two recording passes over each sector to be recorded. This requires precise alignment of the corresponding pulses which can never be wholly achieved and is often less than acceptable.

The other method is to use a special write head and actuator, a servo track writer which is especially designed to write the full width of the intertrack pitch in a single pass. This is a precision device that can be accurately positioned and aligned. The limitation with the use of this device is that the product head and actuator assembly is normally not such a precision device and can not be made so without undue expense and effort. The product head assembly does not have heads in perfect alignment along an axis or axes parallel to the axis of rotation of the disk or disks. In addition the linear motion of the assembly while moving from track to track is not likely to be exactly radial or precisely aligned with any other path selected for access. The result is the tracks that should be vertically aligned between surfaces are not, nor are the circumferential positions of the various heads aligned. Both these conditions require resynchronizing when switching between tracks even when supposedly aligned parallel to the axis of rotation.

It is important to have each data, transducer, read/write head properly, simultaneously aligned with the corresponding track or cylinder. In use it is the practice to record information, whenever possible on the same track or on a track that can be accessed by switching heads, rather than on a track that requires an actuator access. This obviously enhances the data rate of either reading or writing since an actuator assembly access movement is not required. Accordingly, studies have shown that in practice, 60% of data accesses are made without moving or accessing the transducer assembly. Accordingly, it is important to have each disk drive head or transducer correctly positioned over a track or cylinder so that electrically switching between heads does not also require an access to correctly position the newly addressed head.

SUMMARY OF THE INVENTION

In the method of the present invention, the disk or disks of the assembly are initialized for sector servo operating mode by first recording a clock track on one surface on a disk at a position radially inward of the surface of the disk accessible by the product heads. The product heads are the read/write transducer assemblies which are dedicated to and form a permanent part of the disk drive. This is done by known techniques using a clock head and a pair of speed heads. The clock head applies bit pulses to the clock track with a density normally in excess of a thousand pulses per degree of rotation with a closing accuracy in the range of 10 nanoseconds. To attain this accuracy the rate of disk rotation is established with precision by the speed heads which are aligned with the same track on a write and thereafter read until the time between writing and reading indicates that the exact rotational speed has been achieved. When the clock track has been written and an index position established all subsequent timings and positions during initialization are derived from the train of clock pulses read from the clock track.

The product heads are now used to write a track at the inner crash stop and the outer crash stop using each product head. The servo writer head now accesses each disk surface and determines the position and timing characteristics of the impulses written on the tracks by each product head. The circumferential position of the tracks are determined using a laser interferometer and the circumferential offset is determined by using a count to quantify the circumferential displacement from a true vertical radial alignment of the transducer gaps. The information thus obtained is recorded. The position of the tracks is justified and the circumferential offset is adjusted to establish track positions and sector starting locations and using this information, the sector data is written at each track location displaced by one-half track so that the interface between servo tracks establishes the data track centerline in the normal manner. The product heads will now function during reading or writing as if precisely aligned along an access parallel to the axis of rotation of the disk or disks.

This compensation allows switching between product heads without resynchronization or drastic track repositioning of each head. By using this method of tailoring the servo patterns on the disk surfaces to the product actuator and head assembly, the necessity for adherence to a precise alignment standard is eliminated and less exacting tolerances may be used during actuator manufacture. Head alignment is accomplished by track placement and by measuring the timing characteristics of the selected tracks shifting the encoded servo data to accommodate the individual machine for greater head to track registration accuracy. This results in enhanced product performance at lower cost.

It is an object of the invention to provide a method of initializing a disk assembly with sector servo information written to the full track width by a precision servo write head that is tailored to the particular position of the corresponding dedicated transducer including radial alignment and circumferential timing deviation.

It is a further object of the invention to provide a disk assembly sector servo initialization method wherein the sector servo information applied to the disk surfaces causes all dedicated transducers to be simultaneously aligned with the corresponding track whereby switching between transducers at the same track location requires no movement or seeking by the transducers subassembly.

DETAILED DESCRIPTION

The initialization of a disk file with sector servo information involves several complex operations including placement, file control (motor) and clock writing, offset measurement, surface quality measurement, head and amplifier measurement and track writing testing and qualification.

Figure 1:
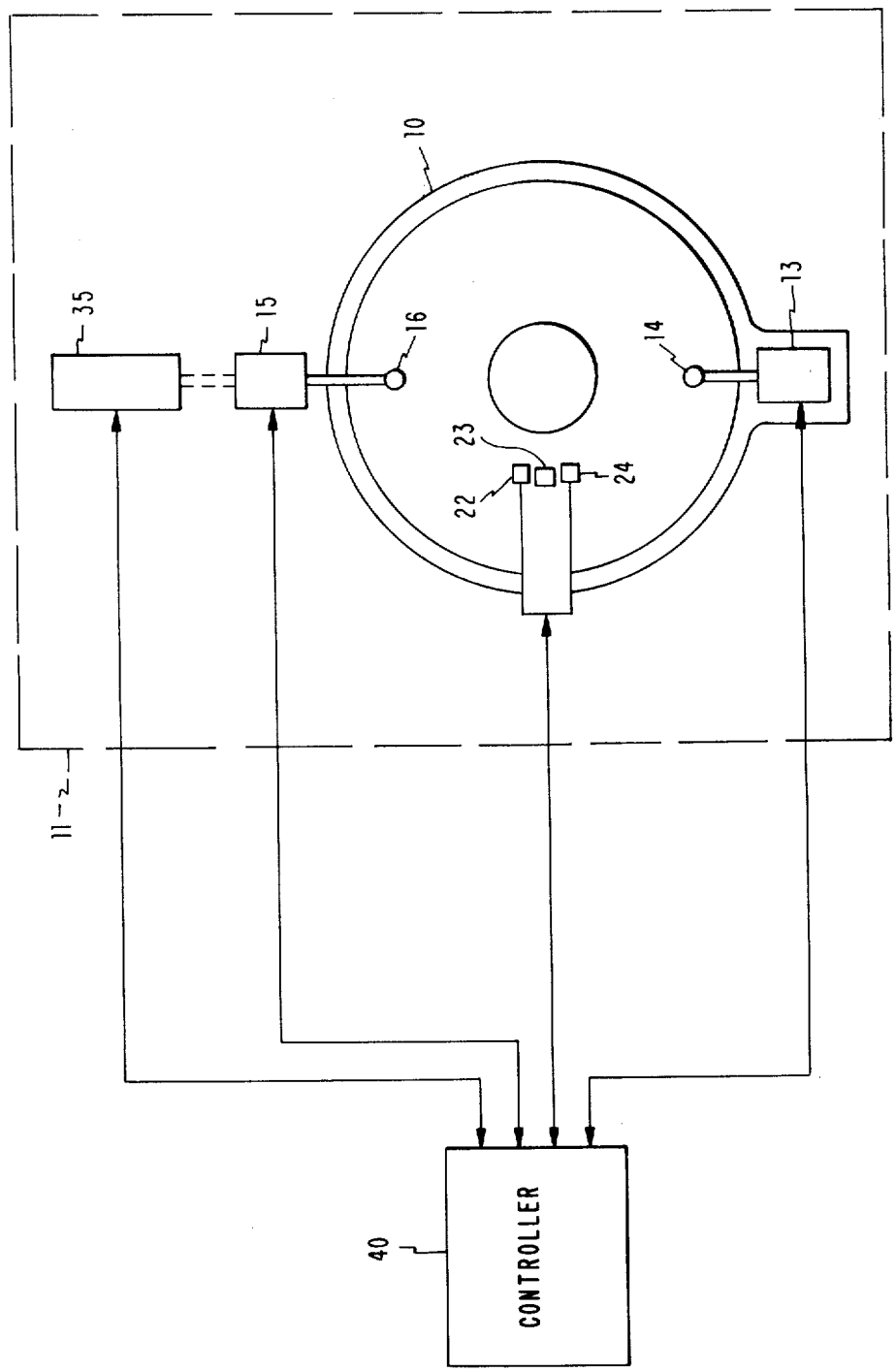
FIG. 1 is a schematic showing of the disk drive being initialized, the servo writer assembly, speed and clock heads and the controller.

Referring to FIG. 1 the file assembly 10 which is to be initialized is mounted on the base 11 of the servo writer assembly with the product actuator 13 positioning the product heads 14 at the outer crash stop. The precision servo writer accessing mechanism 15 causes the servo writer head 16 to access the disk surfaces 12 along a precisely aligned radial track. Although neither product heads 14 nor precision servo writing heads 16 are exactly radial, the product heads can be misaligned by as much as a few degrees whereas the servo writer precision access radially aligns the servo writer head along a track within a few minutes of the exact radial path. The servo writer heads 16 are positioned by the servo writer head position control 19 and the servo control unit 20 at the expected outer crash stop position. The clock heads which include clock head 22 and speed heads 23 and 24 are positioned at the clock head band which is radially inward of the disk area accessible by the product heads 14.

Figure 2A:
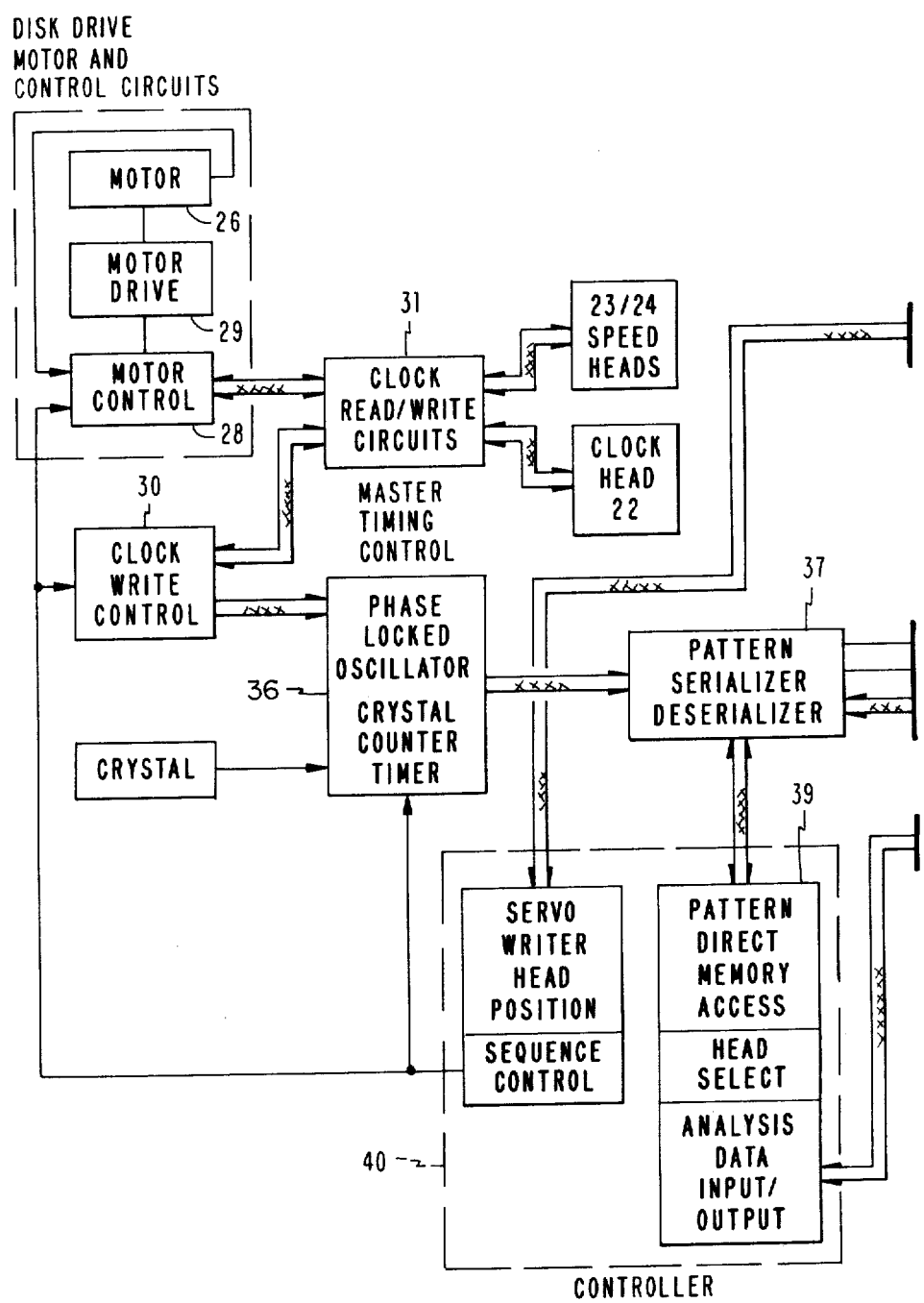
FIG. 2, composed of FIGS. 2A and 2B is a block diagram of the servo writing system used in practicing the described invention.
Figure 2B:
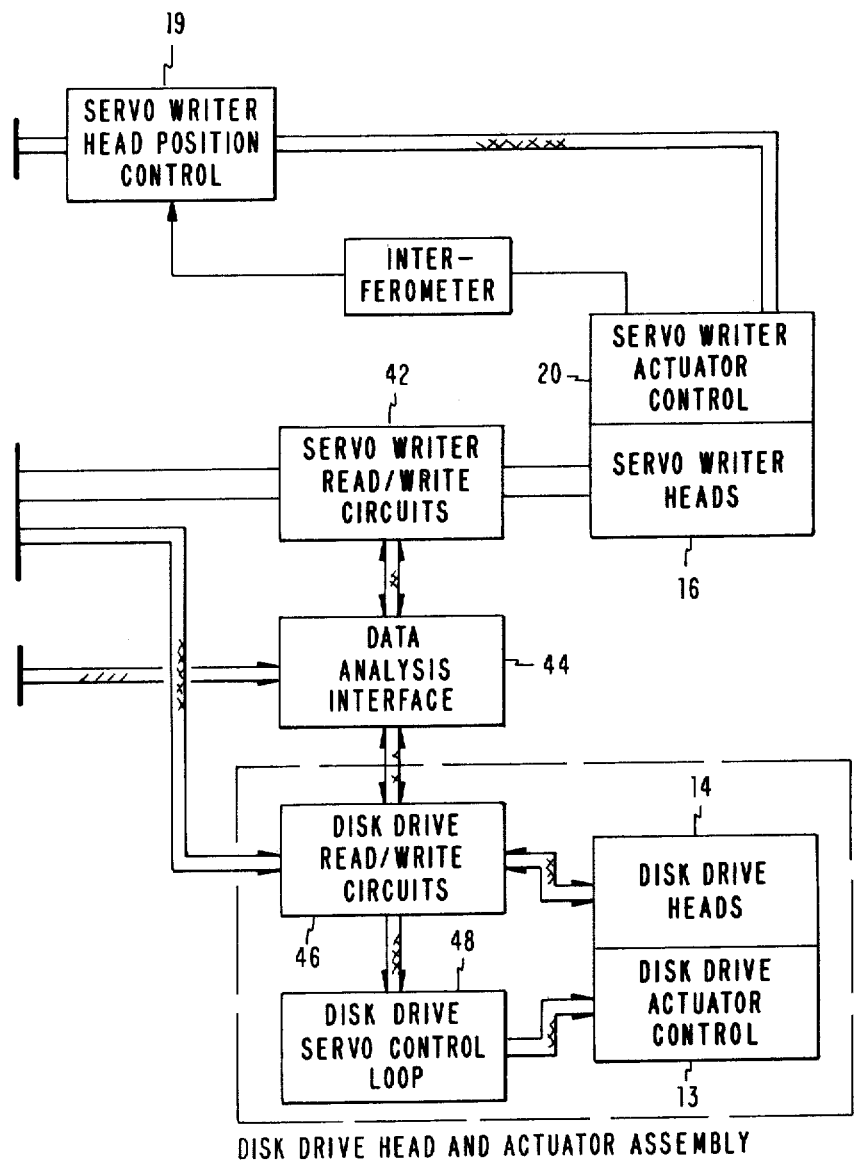

The disk file drive motor 26 (FIG. 2) is energized and driven to a nominal angular velocity by motor control circuit 28 and product motor drive 29, wherein the speed is regulated by a signal on line 27 originating from a sensor or shaft encoder. A single clock track is written which is initiated by clock write control 30 and clock read/write circuits 31 and written by the clock head 22, and the output of this track is used to develop an index. Using this index speed head 23 starts to write continuously; the other speed head 24 being aligned to the same track position starts to read. A zero error between the two speed heads is used as a reference to correct the angular velocity to an exact angular velocity to product the required number of transitions on the clock track and to provide the clock reference with a closure error of no more than 10 nanoseconds. Such a clock track typically records clock pulse trend transitions with a density of in excess of 1,000 clock pulses per degree of rotation. At that time a clock track is written by the clock heads 22 and velocity control is returned to the nominal. Thereafter, the clock generator is referenced to the clock head and all timing is derived from the clock head.

Next a single data track is written under each product head 14 at the outer and inner crash stops. The servo write heads 16 are then positioned over each track and measurements made to indicate the position of each track written relative to the servo write head in time (angular position) and space (radial position). The laser interferometer 35 is utilized to ascertain the precise radial position of the inner and outer tracks written by the product head. The angular position is determined by using a counter to develop the deviation of the product head with respect to the expected radial position. These values are stored for each product head, and a relative curve for each head is derived to determine where each track should be written and at what line (phase relationship). It should be written to produce a pattern which when read by the product heads will appear to have been written by this product head in position, both angular (time) and radial (spacial). This allows head switching without resynchronization or drastic track repositioning of each head. At the same time the tracks are written with a standard head under precisely controlled conditions.

The servo tracks are then written at each track location displaced by one half track pitch. By following the initialization sequence with each product head of the disk drive, all become aligned over the corresponding track or cylinder simultaneously to permit the accessing of any such track by electrically switching between transducer or product heads 14 without a time delay imposed by physical movement of the product actuator 13.

The master timing control 36 including a phase locked oscillator provides timing information which identifies the index position, sectors, bytes, bits and half bits. The pattern serializer deserializer 37 accesses the pattern direct memory access 39 of processor 40 to provide a stream of serial bit information to the servo writer rewrite circuits 42 and thereafter the servo writer head 16 for recording on the disk surface. The processor 40 also positions and sequences the servo writer head; selects the head which is to be activated and provides analysis data derived from the data analysis circuitry 44. Information from pattern serializer deserializer 37 is also directed to the product read/write circuits 46 to provide control information to product servo control loop 48 and thereby to the product actuator control 13 for positioning product heads 14. Also data read by the product heads 14 and data to be written by the product heads is communicated between pattern serializer/deserializer 37 and the product read/write circuits 46.

While the invention has been particularly shown and described with reference to a preferred embodiment, it will be understood by those skilled in the art that various changes in form and detail may be made therein without departing from the spirit and scope of the invention.

Having thus described my invention, what is claimed as new and desired to be secured by Letters Patent is:

1. The method of initializing sector servo information on the disk storage media of a disk assembly which includes a dedicated transducer subassembly using a servo track writing device comprising:
    writing first and second non-adjacent tracks on the surface of said disk storage media using said dedicated transducer subassembly;
    measuring the radial position and circumferential timing of the impulses written relative to the position and timing of said servo track writing device;
    determining the radial position and circumferential timing for each pattern to be written; and
    successively writing the servo tracks by radially positioning said servo track writing device, circumferentially adjusting the write start timing and writing said servo tracks to provide custom placement of the servo information wherein the location and alignment are tailored to the position and path of travel of the associated dedicated transducer subassembly.

2. The disk assembly initialization method of claim 1 wherein the step of writing first and second non-adjacent tracks comprises the writing of the innermost and outermost tracks of the data band of tracks associated with the dedicated transducer.

3. The disk assembly initialization method of claim 2 including a further initial step of applying a clock track to one surface of said disk assembly using a clock head which writes evenly spaced transitions along such clock track except for an index position and thereafter reads such clock track to provide circumferential position and timing information.

4. The disk asembly initialization method of claim 3 wherein the step of determining the radial position and circumferential timing comprises identification of the innermost and outermost track radial positions, determining the track pitch within the data band and positioning the servo write transducer of said servo track writing device at half track displacements from data track positions whereby the servo track patterns are written with the servo pattern track interface identifying the data track portion centerlines.

5. The method of initializing sector servo information on the disk storage media of a disk assembly which includes a dedicated transducer subassembly including multiple transducers using a servo track writing device comprising:
   a. writing an inner track and an outer track on the surface of said disk storage media using said dedicated transducer subassembly;
   b. measuring the radial position and circumferential timing of the impulses written by one of the transducers of said transducer assembly relative to the position and timing of said servo track writing device;
   c. determining the radial position and circumferential timing for each pattern to be written;
   d. successively writing the servo tracks by radially positioning said servo track writing device, circumferentially adjusting the write start timing and writing said servo tracks to provide custom placement of the servo information wherein the location and alignment are tailored to the position and path of travel of the associated dedicated transducer; and
   e. repeating steps b, c and d with respect to each transducer of said dedicated transducer subassembly to cause each transducer to be radially and circumferentially aligned with the corresponding track whereby switching between heads at a given track location does not require a seek or movement by said dedicated transducer subassembly.

6. The disk assembly initialization method of claim 5 wherein the step of writing first and second non-adjacent tracks comprises the writing of the innermost and outermost tracks of the data band of tracks associated with the dedicated transducer subassembly.

7. The disk assembly initialization method of claim 6 including a further initial step of applying a clock track to one surface of said disk assembly using a clock head which writes evenly spaced transitions along such clock track except for an index position and thereafter reads such clock track to provide circumferential position and timing information.

8. The disk assembly initialization method of claim 7 wherein step a, determining the radial position and circumferential timing with respect to each transducer, comprises identification of the innermost and outermost track radial positions determining the track pitch within the data band and positioning the servo write transducer of said servo track writing device at half track displacements from data track positions whereby the servo track patterns are written with the servo pattern track interface identifying the data track portion centerlines.

* * * * *